United States Patent
Naruse et al.

(10) Patent No.: US 10,050,486 B2
(45) Date of Patent: Aug. 14, 2018

(54) MOTOR BOBBIN

(71) Applicant: DUPONT TEIJIN ADVANCED PAPERS (JAPAN), LTD., Tokyo (JP)

(72) Inventors: Shinji Naruse, Yokohama (JP); Tatsushi Fujimori, Ibaraki (JP); Chihiro Kondo, Kobe (JP); Yasunori Tanaka, Yokohama (JP)

(73) Assignee: DUPONT TEIJIN ADVANCED PAPERS (JAPAN), LTD., Tokyo (JP)

( * ) Notice: Subject to any disclaimer, the term of this patent is extended or adjusted under 35 U.S.C. 154(b) by 407 days.

(21) Appl. No.: 14/382,140

(22) PCT Filed: Mar. 6, 2013

(86) PCT No.: PCT/JP2013/056177
§ 371 (c)(1),
(2) Date: Aug. 29, 2014

(87) PCT Pub. No.: WO2013/133337
PCT Pub. Date: Sep. 12, 2013

(65) Prior Publication Data
US 2015/0303756 A1 Oct. 22, 2015

(30) Foreign Application Priority Data

Mar. 7, 2012 (JP) .................. 2012-050072

(51) Int. Cl.
*H02K 3/32* (2006.01)
*H02K 3/30* (2006.01)
*H02K 3/52* (2006.01)

(52) U.S. Cl.
CPC ............ *H02K 3/325* (2013.01); *H02K 3/30* (2013.01); *H02K 3/522* (2013.01); *H02K 2203/12* (2013.01)

(58) Field of Classification Search
CPC ...... H02K 15/022; H02K 15/10; H02K 3/325; H02K 3/345; H02K 3/46; H02K 3/30;
(Continued)

(56) References Cited

U.S. PATENT DOCUMENTS 4,467,011 A * 8/1984 Brooks .................. C08L 79/08
428/322.2
4,695,419 A * 9/1987 Inariba ................. H02K 15/022
264/259

(Continued)

FOREIGN PATENT DOCUMENTS

JP 09291160 A * 11/1997
JP 2002-142399 5/2002
(Continued)

OTHER PUBLICATIONS

International Search Report dated Jun. 11, 2013 in International Application No. PCT/JP2013/056177.
Communication pursuant to Article 94(3) EPC dated Apr. 10, 2017 in corresponding European patent application No. 13 758 708.5.
(Continued)

*Primary Examiner* — Tran Nguyen
(74) *Attorney, Agent, or Firm* — Wenderoth, Lind & Ponack, L.L.P.

(57) ABSTRACT

A motor bobbin having a bobbin body portion around which a coil is to be wound, and flange portions provided integrally to both end portions of the bobbin body portion. The bobbin includes: a molded resin article formed by using a polymer having amide linkages, and an insulating paper having an aramid paper made of an aramid fibrid and an aramid short fiber. The surface of the molded resin article and the aramid paper are directly bonded to each other. The motor bobbin can cope with an increased efficiency and an increased power output of a motor generator or the like.

8 Claims, 2 Drawing Sheets

(58) Field of Classification Search
CPC ........ H01F 5/02; H01F 41/125; H01F 27/325; B29C 45/14639; B29C 45/14; B32B 5/26; B32B 27/08; B32B 27/12; B32B 27/28
See application file for complete search history.

(56) References Cited

U.S. PATENT DOCUMENTS

| | | | | |
|---|---|---|---|---|
| 5,406,158 | A | * | 4/1995 | Arnold .................. H02K 1/145 310/112 |
| 6,121,388 | A | * | 9/2000 | Umetsu ................. C08K 5/092 525/425 |
| 7,713,892 | B2 | | 5/2010 | Kihara et al. |
| 2009/0047858 | A1 | | 2/2009 | Kihara et al. |
| 2012/0128988 | A1 | | 5/2012 | Yokura et al. |

FOREIGN PATENT DOCUMENTS

| | | | | |
|---|---|---|---|---|
| JP | 2005-102454 | | 4/2005 | |
| JP | 2007089385 | A * | 4/2007 | ............. H02K 3/345 |
| JP | 2008-263704 | | 10/2008 | |
| JP | 2009-124794 | | 6/2009 | |
| JP | 2009-178002 | | 8/2009 | |
| JP | 2009-213311 | | 9/2009 | |
| JP | 2011-4565 | | 1/2011 | |
| JP | 2011234537 | A * | 11/2011 | |
| JP | 2012-29379 | | 2/2012 | |
| WO | 2006/123715 | | 11/2006 | |

OTHER PUBLICATIONS

Official Action dated Feb. 1, 2018 in corresponding European patent application No. 13 758 708.5-1201.

* cited by examiner

MOTOR BOBBIN

TECHNICAL FIELD

The present invention relates to a motor bobbin, and more specifically a motor bobbin to be fitted to a core member such as a magnetic core coil in a state where a coil is wound around the motor bobbin in, for example, a motor stator constituting a motor generator of a hybrid car, an electric automobile, etc., or the like.

BACKGROUND ART

A motor generator functioning selectively as an electric motor and a power generator is mounted on a hybrid car or an electric automobile. Such a motor generator includes, for example, a cylindrical rotor fixed to an output shaft supported rotatably around an axis, a motor stator having an inner peripheral surface away from an outer peripheral surface of the rotor with a predetermined space provided therebetween, and a motor housing accommodating the motor stator.

A motor stator constituting such a motor generator generally includes a core member and a coil. To insulate the core member and the coil from each other, a coil is wound around a bobbin for a motor, and the bobbin around which the coil is wound is fitted to the core member.

For such a motor bobbin, for example, patent applications such as Patent Literature 1 and Patent Literature 2 have been filed so far. Such a conventional motor bobbin is generally made of a synthetic resin, and polyphenylene sulfide or the like is used, for example, in a case of a concentrated winding stator.

However, when the bobbin is made of such a synthetic resin, the lower limit of the thickness of the bobbin is said to be about 0.6 mm, and the recent further increase in efficiency, increase in power output, and reduction in size of motor generators and the like are not necessarily sufficiently coped with.

Under such circumstances and regarding the size reduction, a motor bobbin is proposed in which a bobbin body portion and flange portions are made of an insulating paper, and at least surfaces of the bobbin body portion and the flange portions made of the insulating paper to be in contact with a coil is made of an aromatic polyamide fiber (Patent Literature 3). In this technology, the insulating paper used has a structure in which heat-resistant sheets (9) and (9) made of the aromatic polyamide fiber are provided on both top and bottom sides of a substrate with adhesive agents (10) and (10) interposed therebetween. In addition, an acrylic adhesive agent or a thermosetting resin composition containing an epoxy resin component, a phenolic resin component, or an acrylic resin component, and an imidazole-based curing agent component is used as the adhesive agents.

It is said that a bobbin for a motor required to have a high efficiency and a large output has to fulfill the following four characteristics simultaneously:
1) being thin (small thickness);
2) preventing ground fault between a coil and a core member (high withstand voltage, partial discharge resistance);
3) withstanding heat generated by the coil (heat resistance); and
4) having mechanical strength. In particular, the small thickness is considered to be extremely important in the sense that the thinner the bobbin is, the more the coil can be increased, so that the space factor can be increased, and the increase in power output can be achieved.

PRIOR ART REFERENCES

Patent Literatures

Patent Literature 1: JP 2005-102454A
Patent Literature 2: JP 2002-142399A
Patent Literature 3: JP 2008-263704A

SUMMARY OF INVENTION

An object of the present invention is to provide a motor bobbin capable of coping with an increased efficiency and an increased power output of a motor generator or the like.

In view of such circumstances, the present inventors have conducted intensive study to develop a motor bobbin capable of coping with an increased efficiency and an increased power output of a motor generator or the like, and, consequently, have reached the present invention.

In a first aspect, the present invention provides a motor bobbin having a bobbin body portion around which a coil is to be wound, and flange portions provided integrally to both end portions of the bobbin body portion, the motor bobbin comprising:

a molded resin article formed by using a polymer having amide linkages; and an insulating paper comprising an aramid paper made of an aramid fibrid and an aramid short fiber, wherein a surface of the molded resin article and the aramid paper are directly bonded to each other.

In a second aspect, the present invention provides the motor bobbin according to the first aspect, wherein a surface of the insulating paper in contact with the molded resin article is impregnated with a resin forming the molded resin article.

In a third aspect, the present invention provides the motor bobbin according to the first or second aspect, wherein the molded resin article has a groove for positioning the coil.

In a forth aspect, the present invention provides a method for producing the motor bobbin according to any one of the first to third aspects, the method comprising bonding the molded resin article to the insulating paper simultaneously with molding of the molded resin article.

In a fifth aspect, the present invention provides a motor comprising a stator obtained by integrating a core member with the motor bobbin according to any one of the first to third aspects, and winding a coil around the motor bobbin.

In a sixth aspect, the present invention provides a motor generator comprising a stator obtained by integrating a core member with the motor bobbin according to any one of the first to third aspects, and winding a coil around the motor bobbin.

In a seventh aspect, the present invention provides a power generator comprising a stator obtained by integrating a core member with the motor bobbin according to any one of the first to third aspects, and winding a coil around the motor bobbin.

DESCRIPTION OF EMBODIMENTS (Insulating Paper)

Figure 1:
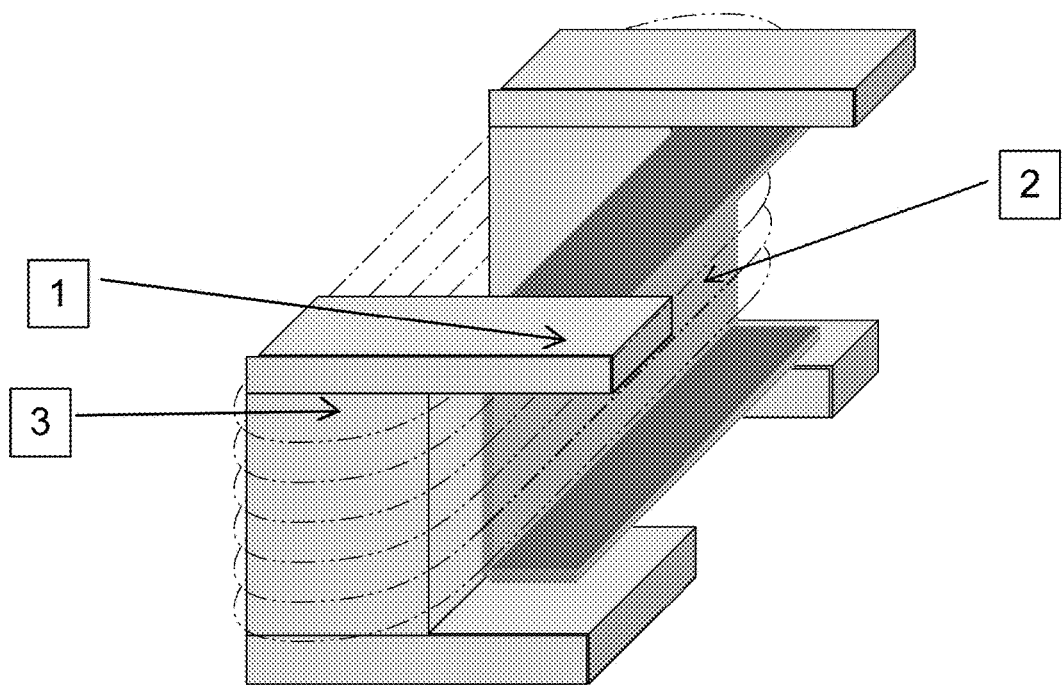
FIG. 1 is a perspective view of a motor bobbin of an embodiment.
Figure 2:
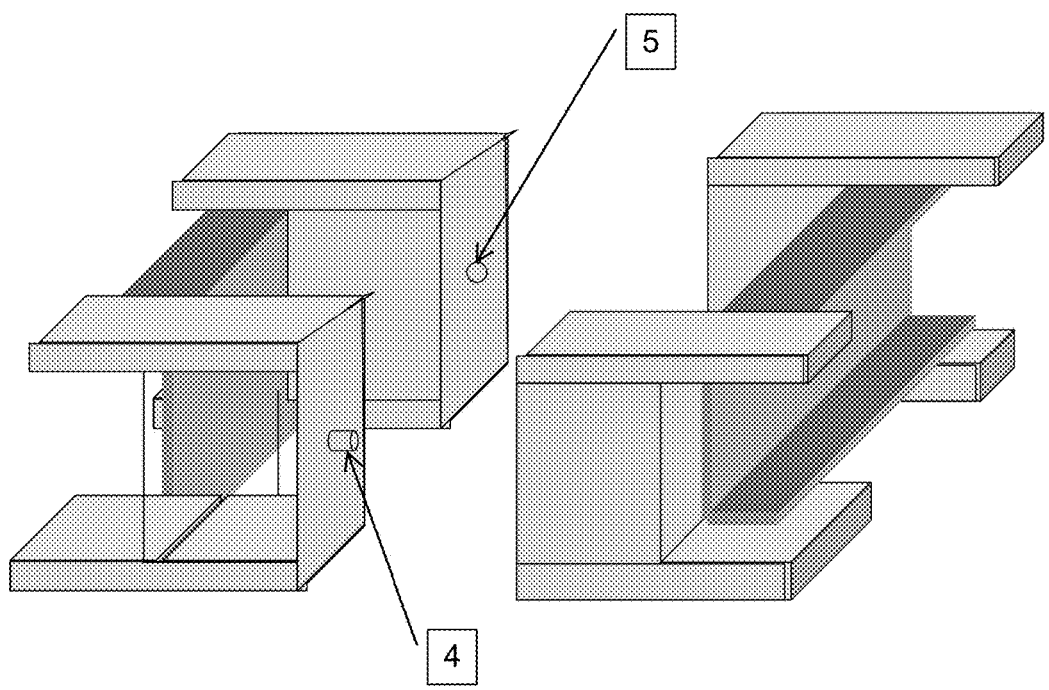
FIG. 2 shows an aspect in which a pair of motor bobbins of the embodiment are combined (a stator core is to be placed at the center).
Figure 3:
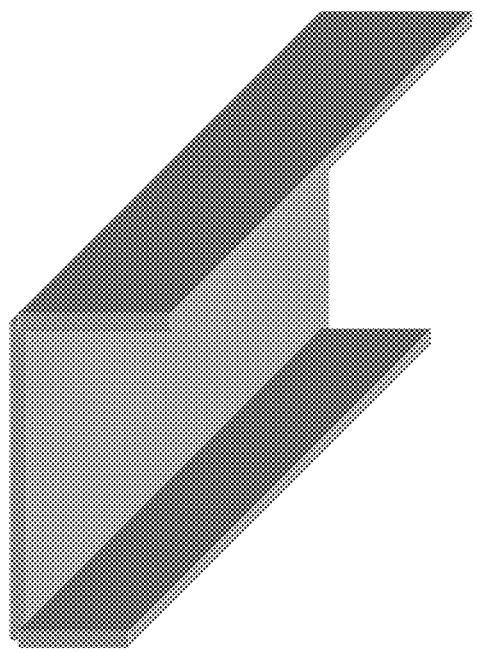
FIG. 3 is a perspective view of a bent insulating paper to constitute a bobbin.

In the present invention, an insulating paper means an aramid paper at least one surface of which is made of an aramid fibrid and an aramid short fiber, and an aramid paper itself and laminated sheets including an aramid paper fall into the insulating paper.

(Aramid)

In the present invention, an aramid means a linear polymeric compound (aromatic polyamide) in which 60% or more of amide linkages are directly bonded to aromatic rings. Examples of such an aramid include poly(meta-phenylene isophthalamide), copolymers thereof, poly(para-phenylene terephthalamide), copolymers thereof, poly(para-phenylene)-co-poly(3,4'-diphenyl ether)terephthalamide, and the like. These aramids are industrially produced by a conventionally known interfacial polymerization method, solution polymerization method, or the like using, for example, isophthaloyl dichloride and m-phenylenediamine, and are available as commercial products. However, the aramids are not limited thereto. Of these aramids, poly (meta-phenylene isophthalamide) is preferably used, because it has excellent characteristics such as formability, thermal bondability, flame retardancy, and heat resistance.

(Aramid Fibrid)

In the present invention, an aramid fibrid is film-like aramid particles capable of being formed into paper, and also referred to as an aramid pulp (see Japanese Examined Patent Application Publications Nos. Sho 35-11851 and Sho 37-5732, etc.).

It is well known that an aramid fibrid is used as a paper-making raw material after subjected to disintegration treatment and beating/refining treatment, as in the case of ordinary wood pulp. To keep the quality suitable for paper making, a so-called beating/refining treatment can be conducted on the aramid fibrid. This beating/refining treatment can be conducted by using a disk refiner, a beater, or other paper-making raw material processing apparatus exerting a mechanical cutting effect. In this operation, the morphological change of the fibrid can be monitored by the drainability (freeness) testing method specified in Japanese Industrial Standard P 8121. In the present invention, the freeness of the aramid fibrid subjected to the beating/refining treatment is preferably in a range from 10 cm$^3$ to 300 cm$^3$. A fibrid having a freeness above the range may lead to decrease in strength of a heat-resistant electrical insulating sheet material formed from the fibrid. On the other hand, when an attempt is made to obtain a freeness below 10 cm$^3$, the efficiency of utilization of the inputted mechanical power is lowered, and the amount of treatment per unit time decreases in many cases. Moreover, the fibrid becomes excessively fine, so that the so-called binder function tends to decrease. Hence, no significant advantage is seen by obtaining a freeness smaller than 10 cm$^3$, as described above.

(Aramid Short Fiber)

The aramid short fiber is one obtained by cutting a fiber made of an aramid. Examples of such a fiber include those available under the trade names of "TEIJIN CONEX (registered trademark)" of Teijin Limited, "NOMEX (registered trademark)" of DuPont, and the like, but are not limited thereto.

The length of the aramid short fiber can be selected in a range generally from 1 mm inclusive to 50 mm exclusive, and preferably from 2 to 10 mm. If the length of the short fiber is less than 1 mm, mechanical characteristics of the sheet material deteriorate. On the other hand, a short fiber having a length of 50 mm or more tends to undergo "entanglement", "bundling", and the like during production of an aramid paper by a wet method, and hence tends to cause defects.

(Aramid Paper)

In the present invention, the aramid paper is a sheet-like article mainly constituted of the above-described aramid fibrid and aramid short fiber, and has a thickness in a range generally from 20 μm to 1000 μm, and preferably from 25 to 200 μm. In addition, the aramid paper has a basis weight in a range generally from 10 g/m$^2$ to 1000 g/m$^2$, and preferably from 15 to 200 g/m$^2$. It is particularly preferable that aramid fibrid/aramid short fiber=30/70 to 70/30 (weight ratio).

In general, the aramid paper is produced by a method in which the above-described aramid fibrid and aramid short fiber are mixed with each other, and then a sheet is formed therefrom. Specific examples of employable methods include a method in which the aramid fibrid and aramid short fiber are dry blended with each other, and then a sheet is formed by using an air stream; a method in which the aramid fibrid and the aramid short fiber are dispersed in a liquid medium, and mixed with each other, then a sheet is formed by discharging the dispersion onto a liquid permeable support, for example, a wire or a belt, and the liquid is removed from the sheet, which is then dried; and the like. Of these methods, the so-called wet paper making method is preferably selected in which water is used as the medium.

In the wet paper making method, aqueous slurries of at least the aramid fibrid and the aramid short fiber or an aqueous slurry of a mixture thereof is fed to a paper machine and dispersed, followed by water-draining, water-squeezing, and drying operations, and then the paper is wound as a sheet, in general. As the paper machine, a Fourdrinier paper machine, a cylinder paper machine, an inclined-type paper machine, a combination paper machine in which any ones of these paper machines are combined, or the like is used. In the case of the production using a combination paper machine, it is possible to obtain a composite sheet comprising multiple paper layers by forming sheets from slurries having different mixing ratios and integrating these sheets. If necessary, additives such as a dispersibility improver, a defoamer, and a strengthening agent are used in the paper making.

The density and mechanical strength of the aramid paper obtained as described above can be improved by hot-pressing the aramid paper between a pair of rolls at high temperature and high pressure. When metal rolls are used, the hot-pressing conditions are, for example, that the temperature is in a range from 100 to 400° C. and the linear pressure is in a range from 50 to 400 kg/cm, but are not limited thereto. It is also possible to laminate multiple aramid papers during the hot pressing. The above-described hot pressing may be conducted multiple times in any order.

In the present invention, the insulating paper comprising an aramid paper made of an aramid fibrid and an aramid short fiber and provided on a surface side, of the insulating paper, bonded to a molded resin article may be the aramid paper itself or a sheet obtained by laminating the aramid paper, a film, and the aramid paper on each other and bonding them together with an adhesive agent or the like, the film being made of a polymer such as polyethylene terephthalate, polyethylene naphthalate, polyimide, polytetrafluoroethylene, polyphenylene sulfide, polyamide, semi-aromatic polyamide, or phenoxy, a blend or alloy of any of these polymers, or the like. Here, any suitable adhesive agent ordinarily used in this technical field can be used as the adhesive agent used for laminating the aramid papers. Examples of the adhesive agent include epoxy-based, acrylic-based, phenol-based, polyurethane-based, silicon-based, polyester-based, and amide-based adhesive agents and the like, but are not limited thereto. An adhesive composition preferable for the laminate of the aramid papers may be an acrylic-based, silicon-based, polyurethane-based, polyester-based, or epoxy-based adhesive composition. In addition, in the case of lamination of the above-described film by using the adhesive agent, the film is almost always drawn, and hence the laminated sheet tends to deform because of shrinkage occurring when a motor bobbin of the present invention is produced by a melt injection molding method during fabrication of the bobbin described later. Hence, it is preferable to use a method in which a film formed by melting the polymer and the aramid papers stacked together in advance are heated under pressure to impregnate the aramid papers with the molten polymer; a method in which a paper making product (web) of the polymer and the aramid papers integrated together during the papermaking or stacked together are heated under pressure to impregnate the aramid papers with the molten resin; a method in which a resin is melt extruded onto the aramid paper and thermally melt bonded thereto; or the like.

The number of layers in the laminate can be selected, as appropriate, depending on the application and purpose of the laminate. At least one surface layer is preferably an aramid paper layer, because the excellent slippability achieved by the aramid paper layer brings about an effect of allowing the bobbin as described above to be easily inserted, for example, between a core member of a motor stator and a coil, i.e., in a slot provided to the core member, in a motor. For example, the laminate may be a laminated sheet, as described in Japanese Patent Application Publication No. 2006-321183, including two layers of a polymer and an aramid paper, the polymer being made of an aromatic polyamide resin and an epoxy group-containing phenoxy resin having an epoxy group(s) in its molecule and having a ratio of the epoxy group-containing phenoxy resin of 30 to 50% by mass, the laminated sheet being fabricated by a method of melt-extruding and thermally melt-bonding the resins onto the aramid paper, or may be a laminated sheet including three layers of an aramid paper, the polymer, and an aramid paper. However, the number of the laminate is not limited thereto.

The thickness of the laminate can be selected, as appropriate, depending on the application and purpose of the laminate, and any thickness can be selected, unless the thickness causes any trouble in processability during bending, winding, and the like. In general, from the viewpoint of the processability, a laminate having a thickness in a range from 50 μm to 1000 μm (particularly preferably from 70 to 200 μm) is preferable, but the thickness is not limited thereto.

(Molded Resin Article)

In the present invention, the molded resin article refers to a molded article fabricated by a melt injection molding method in which a polymer having amide linkages such as polyamide 6, polyamide 66, polyamide 612, polyamide 11, polyamide 12, copolymerized polyamide, polyamide MXD6, polyamide 46, methoxymethylated polyamide, or semi-aromatic polyamide, a polymer containing a polyamide resin composition as shown in Japanese Patent Application Publication No. 2006-321951, a mixture thereof, or a mixture of any of these polymers and an inorganic material such as glass fiber in a molten state is inserted into a desired mold, and detached from the mold after cooling. A molded article of a mixture of a semi-aromatic polyamide and glass fiber is particularly preferable because of the high heat resistance. Examples of the mixture include Zytel (registered trademark) HTN 51G and 52G of DuPont, and the like, but the mixture is not limited thereto.

It is preferable to mold the molded resin article to have a groove for positioning a coil in a portion to be in contact with the coil, because this stabilizes the position of the coil, and enables regular winding of the coil with high precision, which brings about an effect of improving the efficiency of a motor generator or the like.

(Method for Producing Motor Bobbin)

A motor bobbin in which a part of the molded resin article and the insulating paper are bonded to each other can be fabricated as follows. Specifically, the insulating paper is placed in the mold in advance so as to come at least partially into contact with the molten polymer, so that at least a surface portion of the insulating paper is impregnated with the molten polymer. This fabrication is preferably conducted, because it is unnecessary to use an adhesive agent, and the bonding can be achieved simultaneously with the fabrication of the molded resin article.

Hereinafter, the present invention is described based on Examples. Note that these Examples are presented for illustrating contents of the present invention by way of examples, and the contents of the present invention are not limited to these Examples at all.

EXAMPLES

Reference Example

Preparation of Raw Material

A fibrid of poly(meta-phenylene isophthalamide) was produced by using an apparatus (wet-deposition apparatus) for producing pulp particles, the apparatus being constituted of a combination of a stator and a rotor as described in Japanese Patent Application Publication No. Sho 52-15621. This fibrid was treated by using a disintegrator and a beater/refiner to adjust the length-weighted mean fiber length to 0.9 mm. The freeness of the obtained aramid fibrid was 90 $cm^3$.

Meanwhile, a meta-aramid fiber (NOMEX (registered trademark), single yarn fineness: 2 denier) manufactured by DuPont was cut into pieces having a length of 6 mm (hereinafter referred to as "aramid short fiber").

(Production of Insulating Papers)

The prepared aramid fibrid and aramid short fiber were each dispersed in water to prepare slurries. These slurries were mixed with each other at a mixing ratio (weight ratio) of the fibrid to the aramid short fiber of 1/1, and a sheet-like article was fabricated by using a TAPPI-type manual paper machine (cross-sectional area: 625 $cm^2$). Subsequently, this sheet-like article was hot pressed by metal calender rolls at a temperature of 330° C. and a linear pressure of 300 kg/cm. Thus, each of aramid papers shown in Examples 1 and 2 of Table 1 was obtained.

In addition, by using the aramid paper and a semi-aromatic polyamide resin composition containing 50% by weight of an epoxy group-containing phenoxy resin, aramid paper-containing laminated sheets shown in Examples 3 and 4 of Table 1 having a three-layer structure of aramid paper/resin composition/aramid paper in which the aramid papers were arranged on outer sides were obtained by the method described in Japanese Patent Application Publication No. 2006-321183.

In addition, aramid paper-containing laminated sheets shown in Examples 5 and 6 of Table 1 having a three-layer structure of aramid paper/polyethylene terephthalate film/aramid paper in which the aramid papers were arranged on outer sides were obtained by laminating the aramid papers onto a polyethylene terephthalate film (S2816, thickness: 16 μm) manufactured by Toray Industries, Inc. by using an adhesive agent.

Examples

Production of Motor Bobbins

Figure 4:
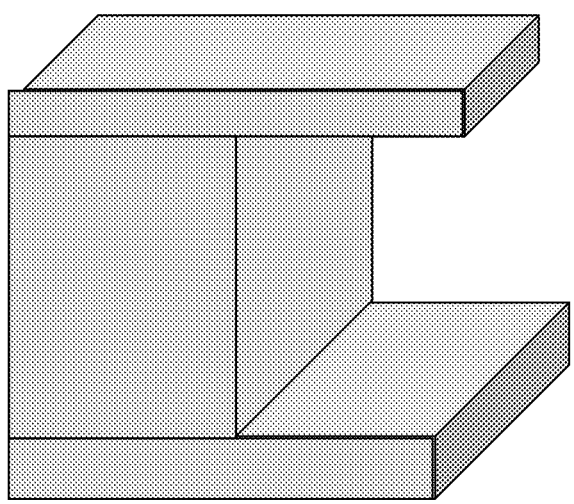
FIG. 4 is a perspective view of a molded resin article to constitute a bobbin.

Motor bobbins as shown in FIG. 1 were obtained by conducting insertion molding using each of the insulating papers produced in Reference Example and, as a polymer, a semi-aromatic polyamide (Zytel (registered trademark) HTN51G35G35EF) manufactured by DuPont under the conditions shown in Table 1. Specifically, the insulating paper produced in Reference Example was placed in advance in a portion which corresponded to both end surfaces of a bobbin body portion in a mold for forming a motor bobbin, and the semi-aromatic polyamide manufactured by DuPont was introduced into the mold. Thus, the semi-aromatic polyamide was injection molded by a melt injection molding method to obtain each motor bobbin shown in FIG. 1 in which the molded resin article and the insulating paper were integrally molded to form a bobbin body portion (shown in FIG. 4) and at least surface portion of the insulating paper was impregnated with the molten polymer to directly bond the surface portion to a surface of the molded resin article. Values of main characteristics of the thus obtained motor bobbins were evaluated by the following methods. Table 1 shows the results.

(Measurement Methods)

(1) Measurement of Basis Weight and Thickness

These were measured in accordance with JIS C 2300-2.

(2) Calculation of Density

The density was calculated by dividing the basis weight by the thickness.

(3) Bonding Quality

The bonding portion between the insulating paper and the molded resin article was visually observed. A bonded portion having no wrinkle (rising of the insulating paper) was evaluated to be "good", and a bonded portion having any wrinkle was evaluated to be "poor."

(4) Appearance of Insulating Paper Portion

The degree of warp of the insulating paper portion due to heat during the molding was visually determined.

TABLE 1

| Characteristics | Unit | Ex. 1 | Ex. 2 | Ex. 3 | Ex. 4 | Ex. 5 | Ex. 6 |
|---|---|---|---|---|---|---|---|
| Insulating paper | | | | | | | |
| Aramid paper | wt % | 3 | 3 | 0 | 0 | 0 | 0 |
| Basis weight | g/m2 | 115 | 115 | 37 | 37 | 37 | 37 |
| Thickness | μm | 135 | 135 | 51 | 51 | 51 | 51 |
| Density | g/cm3 | 0.87 | 0.87 | 0.73 | 0.73 | 0.73 | 0.73 |
| Laminated sheet | wt % | 0 | 0 | 3 | 3 | 3 | 3 |
| Basis weight | g/m2 | | | 128 | 128 | 128 | 128 |
| Thickness | μm | | | 140 | 140 | 140 | 140 |
| Density | g/cm3 | | | 0.91 | 0.91 | 0.91 | 0.91 |
| Polymer | | | | | | | |
| Semi-aromatic Polyamide | wt % | 97 | 97 | 97 | 97 | 97 | 97 |
| Polyphenylene sulfide | wt % | 0 | 0 | 0 | 0 | 0 | 0 |
| Molding | | | | | | | |
| Polymer Temp. | ° C. | 322 | 322 | 322 | 322 | 322 | 322 |
| Mold temp. | ° C. | 81 | 152 | 81 | 152 | 81 | 152 |
| Bonding quality | | good | good | good | good | good | good |
| Appearance of insulating paper portion | | good | good | good | good | warp | warp |

From the results in Table 1, it can be understood that each of the motor bobbins of Examples is useful as a motor bobbin capable of coping with an increased efficiency and an increased power output of a motor generator or the like, because of the following reasons. Specifically, since the bobbin body portion is made of the insulating paper, and has a small thickness (maximum thickness: 135 to 140 μm), the increase in efficiency can be expected by achieving a high coil space factor. In addition, the bonding between the insulating paper and the resin is so sufficient that the breakdown voltage is sufficiently high. Moreover, since the heat resistance of each of the aramid paper and polymer used is high, it is conceivable that the motor bobbin sufficiently withstands the heat generated by the coil.

Comparative Examples

Production of Motor Bobbins

Motor bobbins were obtained by conducting insertion molding in the same manner as in Examples using the insulating papers and, as a polymer, polyphenylene sulfide (FORTRON (registered trademark) 1140A64)) manufactured by POLYPLASTICS CO., LTD. under the conditions shown in Table 2. Values of main characteristics of the thus obtained motor bobbins were evaluated in the same manner as in Example 1. Table 2 shows the results.

TABLE 2

| Characteristics | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Insulating paper | | | | | | | |
| Aramid paper | wt % | 3 | 3 | 0 | 0 | 0 | 0 |
| Basis weight | g/m2 | 115 | 115 | 37 | 37 | 37 | 37 |
| Thickness | μm | 135 | 135 | 51 | 51 | 51 | 51 |
| Density | g/cm3 | 0.87 | 0.87 | 0.73 | 0.73 | 0.73 | 0.73 |
| Laminated sheet | wt % | 0 | 0 | 3 | 3 | 3 | 3 |
| Basis weight | g/m2 | | | 128 | 128 | 128 | 128 |
| Thickness | μm | | | 140 | 140 | 140 | 140 |
| Density | g/cm3 | | | 0.91 | 0.91 | 0.91 | 0.91 |
| Polymer | | | | | | | |
| Semi-aromatic Polyamide | wt % | 0 | 0 | 0 | 0 | 0 | 0 |
| Polyphenylene sulfide | wt % | 97 | 97 | 97 | 97 | 97 | 97 |
| Molding | | | | | | | |
| Polymer temp. | ° C. | 323 | 323 | 323 | 323 | 323 | 323 |
| Mold temp. | ° C. | 81 | 156 | 81 | 156 | 81 | 156 |
| Bonding quality | | poor | poor | poor | poor | poor | poor |
| Appearance of insulating paper portion | | good | good | good | good | warp | warp |

As shown in the results shown in Table 2, in each of the motor bobbins of Comparative Examples, the insulating paper was not impregnated with the resin in some portions, and a space was found between the insulating paper and the molded resin article in some portions under visual observation. It is conceivable that this may cause partial discharge when the bobbin is used in a motor or the like, decrease in efficiency due to decrease in coil space factor because of the thickening of the space portion, a trouble during fitting to a core, and the like. Hence, it can be understood that the motor bobbins of Comparative Examples are not suitable as motor bobbins capable of coping with an increased efficiency and an increased power output of a motor generator or the like.

REFERENCE SIGNS LIST 1 bobbin flange portion
2 bobbin body portion
3 groove for positioning coil
4 protrusion for assembly during fitting of bobbin to stator core
5 recess for assembly during fitting of bobbin to stator core

What is claimed is:

1. A motor bobbin having a bobbin body portion around which a coil is to be wound, and flange portions provided integrally to both end portions of the bobbin body portion, the motor bobbin comprising:
   a molded resin article formed by using a polymer having amide linkages; and
   an insulating paper comprising an aramid paper made of an aramid fibrid and an aramid short fiber, wherein
   a surface of the molded resin article and the aramid paper are directly bonded to each other by placing the insulating paper in a mold in advance so as to come at least partially into contact with the molten polymer, so that at least a surface portion of the insulating paper is impregnated with the molten polymer.

2. The motor bobbin according to claim 1, wherein the molded resin article is provided with a groove for positioning the coil.

3. A method for producing the motor bobbin according to claim 1, the method comprising placing the insulating paper in the mold in advance so as to come at least partially into contact with the molten polymer, so that at least a surface portion of the insulating paper is impregnated with the molten polymer; and bonding the molded resin article to the insulating paper simultaneously with molding of the molded resin article.

4. A motor comprising a stator obtained by integrating a core member with the motor bobbin according to claim 1, and winding a coil around the motor bobbin.

5. A motor generator comprising a stator obtained by integrating a core member with the motor bobbin according to claim 1, and winding a coil around the motor bobbin.

6. A power generator comprising a stator obtained by integrating a core member with the motor bobbin according to claim 1, and winding a coil around the motor bobbin.

7. The motor bobbin according to claim 1, wherein the molded resin article is formed by a mixture of a polyamide and glass fiber.

8. The method for producing the motor bobbin according to claim 3, wherein the molded resin article is formed by a mixture of a polyamide and glass fiber.

* * * * *